United States Patent
Fiveland et al.

(10) Patent No.: US 7,743,753 B2
(45) Date of Patent: Jun. 29, 2010

(54) IGNITION SYSTEM UTILIZING IGNITER AND GAS INJECTOR

(75) Inventors: Scott B. Fiveland, Metamora, IL (US); Jonathan William Anders, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 143 days.

(21) Appl. No.: 12/078,418

(22) Filed: Mar. 31, 2008

(65) Prior Publication Data

US 2009/0241896 A1   Oct. 1, 2009

(51) Int. Cl.
*F02G 5/02* (2006.01)
*F02G 5/00* (2006.01)

(52) U.S. Cl. .................. 123/543; 123/547; 123/567

(58) Field of Classification Search .......... 123/543, 123/545, 546, 547, 549, 554, 555, 567, 585, 123/179, 5, 179.6, 266, 150, 143 R, 151, 123/152, 179.2

See application file for complete search history.

(56) References Cited

U.S. PATENT DOCUMENTS

| | | | |
|---|---|---|---|
| 1,988,754 A * | 1/1935 | Sleffel | ............ 123/260 |
| 3,019,777 A | 2/1962 | Candelise | |
| 3,073,289 A | 1/1963 | Candelise | |
| 3,650,261 A | 3/1972 | Hutsell | |
| 3,842,808 A | 10/1974 | Cataldo | |
| 3,976,038 A * | 8/1976 | Stahl | ............ 123/257 |
| 4,023,541 A | 5/1977 | Sakamoto et al. | |
| 4,061,113 A | 12/1977 | Beyler | |
| 4,067,301 A | 1/1978 | Jarry | |
| 4,167,920 A * | 9/1979 | Lepera et al. | ............ 123/1 A |
| 4,203,393 A | 5/1980 | Giardini | |
| 4,306,526 A | 12/1981 | Schaub et al. | |
| 4,498,429 A | 2/1985 | Satow et al. | |
| 4,552,106 A | 11/1985 | Spence | |
| 4,554,890 A | 11/1985 | Okimoto et al. | |
| 4,558,670 A | 12/1985 | Trihey | |
| 4,625,693 A | 12/1986 | Trihey | |
| 4,681,071 A * | 7/1987 | Smith | ............ 123/179.14 |
| 4,766,855 A | 8/1988 | Tozzi | |
| 5,211,142 A | 5/1993 | Matthews et al. | |
| 5,271,365 A | 12/1993 | Oppenheim et al. | |
| 5,499,605 A * | 3/1996 | Thring | ............ 123/70 R |
| 6,032,617 A | 3/2000 | Willi et al. | |
| 6,298,825 B1 | 10/2001 | Hupperich et al. | |
| 6,374,799 B1 | 4/2002 | Firey | |
| 6,427,660 B1 | 8/2002 | Yang | |
| 6,571,770 B1 | 6/2003 | Codan et al. | |
| 6,601,560 B1 * | 8/2003 | Serve | ............ 123/260 |
| 6,640,773 B2 | 11/2003 | Ancimer et al. | |
| 7,171,924 B2 | 2/2007 | Robel et al. | |
| 2003/0221661 A1 | 12/2003 | Willi et al. | |

* cited by examiner

*Primary Examiner*—Mahmoud Gimie
(74) *Attorney, Agent, or Firm*—Finnegan, Henderson, Farabow, Garrett & Dunner

(57) ABSTRACT

An ignition system for use with an engine is disclosed. The ignition system may have an igniter connected to selectively ignite a fuel mixture within the engine, an injector located to inject a non-combustible gas into the engine, and a controller in communication with the igniter and the injector. The controller may be configured to energize the igniter during a first mode of engine operation to ignite the fuel mixture, and cease energizing the igniter during a second mode of engine operation. The controller may also be configured to actuate the injector during the second mode of engine operation to promote auto-ignition of the fuel mixture.

20 Claims, 2 Drawing Sheets

IGNITION SYSTEM UTILIZING IGNITER AND GAS INJECTOR

TECHNICAL FIELD

The present disclosure relates generally to an ignition system and, more particularly, to an ignition system using an igniter and a gas injector to initiate combustion.

BACKGROUND

Engines, including diesel engines, gasoline engines, gaseous fuel powered engines, and other engines known in the art ignite an air/fuel mixture to produce heat. In one example, fuel injected into a combustion chamber of the engine is ignited by way of a spark plug, a glow plug, or an AC/DC ignition source. The heat and expanding gases resulting from this combustion process are directed to displace a piston or move a turbine blade, both of which can be connected to a crankshaft of the engine. As the piston is displaced or the turbine blade is moved, the crankshaft is caused to rotate. This rotation is utilized to directly drive a device such as a transmission to propel a vehicle, or a generator to produce electrical power.

During operation of the engine described above, a complex mixture of air pollutants can be produced as a by product of the combustion process. These air pollutants are composed of, among other things, the oxides of nitrogen ($NO_X$). Due to increased attention on the environment, exhaust emission standards have become more stringent and the amount of $NO_X$ emitted to the atmosphere from an engine is regulated depending on the type of engine, size of engine, and/or class of engine.

It has been established that a well-distributed combustion flame having a low flame temperature can reduce $NO_X$ production to levels compliant with current emission regulations. One way to generate a well-distributed flame with a low flame temperature is to introduce a lean air/fuel mixture into the combustion chambers of the engine. This lean mixture, when ignited, burns at a relatively low temperature. The lowered combustion temperature slows the chemical reaction of the combustion process, thereby decreasing the formation of $NO_X$. As emission regulations become stricter, leaner and leaner mixtures are being implemented.

Although successful at reducing emissions, very lean air/fuel mixtures are difficult to ignite. That is, a conventional igniter (spark plug, glow plug, etc.) may be insufficient to initiate and/or maintain combustion of a mixture that has little fuel (compared to the amount of air present). As a result, the emission reduction available from a typical engine operated in a lean mode may be limited. In addition, conventional igniters suffer from low component life.

One attempt at improving combustion initiation of a lean air/fuel mixture is disclosed in U.S. Pat. No. 7,171,924 (the '924 patent), issued to Robel et al. on Feb. 6, 2007. The '924 patent discloses an internal combustion engine having a combustion chamber, and a piston slidably disposed within the combustion chamber. The piston is configured to reciprocate through a compression stroke to pressurize an air/fuel mixture within the combustion chamber. The internal combustion engine also has an air supply and a fuel supply in selective fluid communication with the combustion chamber. The internal combustion engine further has a supply of non-combustible gas, and an injector in fluid communication with the combustion chamber and the supply of non-combustible gas. The injector is configured to inject the non-combustible gas from the supply into the combustion chamber at a time during or just after completion of the compression stroke to cause auto-ignition of the pressurized air/fuel mixture within the combustion chamber. In one example, the non-combustible gas includes recirculated exhaust. In this manner, ignition of a lean air/fuel mixture may be possible without the use of a conventional igniter.

Although the engine of the '924 patent benefits from auto-ignition of a lean air/fuel mixture, improvements may still be possible. Specifically, in some situations such as during startup or cold operation, the injection of non-combustible gas may, alone, be insufficient to promote auto-ignition.

The disclosed ignition control system is directed to overcoming one or more of the problems set forth above.

SUMMARY OF THE INVENTION

In one aspect, the present disclosure is directed to an ignition system for an engine. The ignition system may include an igniter connected to selectively ignite a fuel mixture within the engine, an injector located to inject a non-combustible gas into the engine, and a controller in communication with the igniter and the injector. The controller may be configured to energize the igniter during a first mode of engine operation to ignite the fuel mixture, and cease energizing the igniter during a second mode of engine operation. The controller may also be configured to actuate the injector during the second mode of engine operation to promote auto-ignition of the fuel mixture.

In another aspect, the present disclosure is directed to a method of initiating combustion within an engine. The method may include locally heating a fuel mixture within the engine to initiate combustion during a first mode of engine operation, and ceasing the local heating during a second mode of engine operation. The method may further include injecting a non-combustible gas into the engine during the second mode of engine operation to facilitate auto-ignition of the fuel mixture.

DETAILED DESCRIPTION

Figure 1:
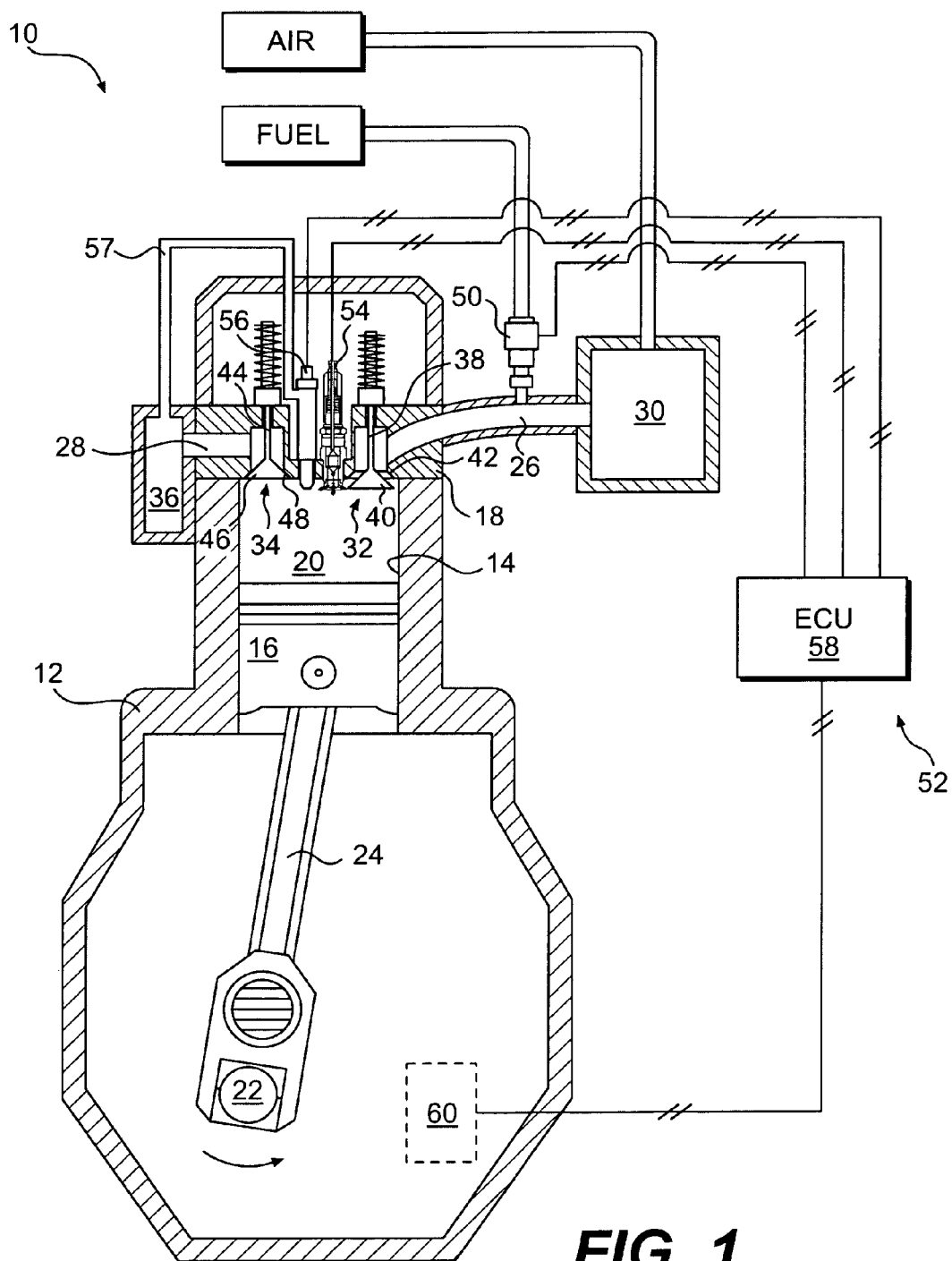
FIG. 1 is a diagrammatic and schematic illustration of an exemplary disclosed engine.

FIG. 1 illustrates an exemplary combustion engine 10. For the purposes of this disclosure, engine 10 is depicted and described as a four-stroke gaseous-fueled engine, for example a natural gas engine. One skilled in the art will recognize, however, that engine 10 may be any other type of combustion engine such as, for example, a gasoline or a diesel-fueled engine. Engine 10 may include an engine block 12 that at least partially defines one or more cylinders 14 (only one shown in FIGS. 1 and 2). A piston 16 may be slidably disposed within each cylinder 14 to reciprocate between a top-dead-center (TDC) position and a bottom-dead-center (BDC) position, and a cylinder head 18 may be associated with each cylinder 14. Cylinder 14, piston 16, and cylinder head 18 may together define a combustion chamber 20. It is contemplated that engine 10 may include any number of combustion chambers 20 and that combustion chambers 20 may be disposed in an "in-line" configuration, a "V" configuration, or in any other suitable configuration.

Engine 10 may also include a crankshaft 22 that is rotatably disposed within engine block 12. A connecting rod 24 may connect each piston 16 to crankshaft 22 so that a sliding motion of piston 16 between the TDC and BDC positions within each respective cylinder 14 results in a rotation of crankshaft 22. Similarly, a rotation of crankshaft 22 may result in a sliding motion of piston 16 between the TDC and BDC positions. In a four-stroke engine, piston 16 may reciprocate between the TDC and BDC positions through an intake stroke, a compression stroke, a combustion or power stroke, and an exhaust stroke. It is also contemplated that engine 10 may alternatively be a two-stroke engine, wherein a complete cycle includes a compression/exhaust stroke (BDC to TDC) and a power/exhaust/intake stroke (TDC to BDC).

Cylinder head 18 may define an intake passageway 26 and an exhaust passageway 28. Intake passageway 26 may direct compressed air or an air and fuel mixture from an intake manifold 30, through an intake opening 32, and into combustion chamber 20. Exhaust passageway 28 may similarly direct exhaust gases from combustion chamber 20, through an exhaust opening 34, and into an exhaust manifold 36.

An intake valve 38 having a valve element 40 may be disposed within intake opening 32 and configured to selectively engage a seat 42. Valve element 38 may be movable between a first position, at which valve element 40 engages seat 42 to inhibit a flow of fluid relative to intake opening 32, and a second position, at which valve element 40 is removed from seat 42 to allow the flow of fluid.

An exhaust valve 44 having a valve element 46 may be similarly disposed within exhaust opening 34 and configured to selectively engage a seat 48. Valve element 46 may be movable between a first position, at which valve element 46 engages seat 48 to inhibit a flow of fluid relative to exhaust opening 34, and a second position, at which valve element 46 is removed from seat 48 to allow the flow of fluid.

A series of valve actuation assemblies (not shown) may be operatively associated with engine 10 to move valve elements 40 and 46 between the first and second positions. It should be noted that each cylinder head 18 could include multiple intake openings 32 and multiple exhaust openings 34. Each such opening would be associated with either an intake valve element 40 or an exhaust valve element 46. Engine 10 may include a valve actuation assembly for each cylinder head 18 that is configured to actuate all of the intake valves 38 or all of the exhaust valves 44 of that cylinder head 18. It is also contemplated that a single valve actuation assembly could actuate the intake valves 38 or the exhaust valves 44 associated with multiple cylinder heads 18, if desired. The valve actuation assemblies may embody, for example, a cam/pushrod/rocker arm arrangement, a solenoid actuator, a hydraulic actuator, or any other means for actuating known in the art.

A fuel injection device 50 may be associated with engine 10 to direct pressurized fuel into combustion chamber 20. Fuel injection device 50 may embody, for example, an electronic valve situated in communication with intake passageway 26. It is contemplated that injection device 50 could alternatively embody a hydraulically, mechanically, or pneumatically actuated injection device that selectively pressurizes and/or allows pressurized fuel to pass into combustion chamber 20 via intake passageway 26 or in another manner (i.e., directly). The fuel may include a compressed gaseous fuel such as, for example, natural gas, propane, bio-gas, landfill gas, or hydrogen. It is also contemplated that the fuel may be liquefied, for example, gasoline, diesel, methanol, ethanol, or any other liquid fuel, and that an onboard pump (not shown) may be required to pressurize the fuel.

The amount of fuel allowed into intake passageway 26 by injection device 50 may be associated with a ratio of fuel-to-air introduced into combustion chamber 20. Specifically, if it is desired to introduce a lean mixture of fuel and air (mixture having a relatively low amount of fuel compared to the amount of air) into combustion chamber 20, injection device 50 may remain in an injecting position for a shorter period of time (or otherwise be controlled to inject less fuel per given cycle) than if a rich mixture of fuel and air (mixture having a relatively large amount of fuel compared to the amount of air) is desired. Likewise, if a rich mixture of fuel and air is desired, injection device 50 may remain in the injecting position for a longer period of time (or otherwise be controlled to inject more fuel per given cycle) than if a lean mixture is desired.

An ignition system 52 may be associated with engine 10 to help regulate the combustion of the fuel and air mixture within combustion chamber 20 during a first mode and a second mode of operation. Ignition system 52 may include an igniter 54, an injector 56, and an electronic control unit (ECU) 58. ECU 58 may be configured to regulate operation of igniter 54 and injector 56 in response to input received from one or more sensors 60.

Igniter 54 may facilitate ignition of the fuel and air mixture within combustion chamber 20 during the first mode of operation. Specifically, during a startup event or during operation of engine 10 in cold conditions, the temperature of the fuel and air mixture within combustion chamber 20 may be too low for efficient auto-ignition of the mixture (even with the help of injector 56). To initiate combustion of the fuel and air mixture, igniter 54 may be energized to locally heat the mixture, thereby creating a flame that propagates throughout combustion chamber 20. As the combustion process progresses, the temperature within combustion chamber 20 may continue to rise to a level that supports efficient auto-ignition of the mixture. In one embodiment, igniter 54 may be a spark plug. It is contemplated, however, that igniter 54 may alternatively embody a glow plug, an RF igniter, a laser igniter, or any other type of igniter known in the art.

Injector 56 may be configured to selectively inject a quantity of pressurized non-combustible gas into combustion chamber 20 to facilitate auto-ignition of the fuel air mixture therein during the second mode of operation. In particular, during warm operation of engine 10 (i.e., operation after startup or after engine 10 has reached a minimum temperature that supports auto-ignition, or during a lean or another operation unsuitable for ignition by igniter 54) injector 56 may be moved between a first position, at which the pressurized gas is blocked from combustion chamber 20, and a second position, at which the pressurized gas flows into combustion chamber 20. The ingress of the pressurized gas when injector 56 is in the second position may cause the mixture of fuel and air within combustion chamber 20 to exceed a threshold pressure and/or a threshold temperature associated with ignition of the mixture. It is contemplated that injector 56 may be caused to pressurize the non-combustible gas during injection into combustion chamber 20, for example, by way of a cam driven plunger, if desired. It is further contemplated that injector 56 may be also be used during the first mode of operation in conjunction with igniter 54 to enhance startability or cold operation of engine 10, if desired.

The non-combustible gas may be, for example, hot exhaust gas recirculated from manifold 36 by way of a passage 57 and pressurized to about 2000 psi prior to injection into combustion chamber 20. Alternatively, the non-combustible gas could include air, oxygen or nitrogen enriched air, $CO_2$, or any other suitable gas. Although described as a non-combustible gas, it is contemplated that the exhaust may, in some situations, contain species representative of complete or partially complete combustion (i.e., the non-combustible gas may contain residual amounts of combustible gas). It is contemplated that, if engine 10 includes a turbocharger, the exhaust may be directed from exhaust manifold 36 at a location upstream of the turbocharger, such that the heat from the combustion process is maintained within the exhaust. During the pressurizing process performed by injector 56, the temperature of the non-combustible gas may rise even more, by an amount substantially proportional to the rise in pressure and may reach temperatures of, for example, about 1000° C. or higher. It is also contemplated that a means for heating the non-combustible gas may also be included, if desired.

ECU 58 may embody a single or multiple microprocessors, field programmable gate arrays (FPGAs), digital signal processors (DSPs), etc., that include a means for controlling an operation of engine 10 in response to signals received from sensor 60. Numerous commercially available microprocessors can be configured to perform the functions of ECU 58. It should be appreciated that ECU 58 could readily embody a general engine microprocessor capable of controlling numerous system functions and modes of operation. Various other known circuits may be associated with ECU 58, including power supply circuitry, signal-conditioning circuitry, actuator driver circuitry (i.e., circuitry powering solenoids, motors, or piezo actuators), communication circuitry, and other appropriate circuitry.

Sensor 60 may be configured to generate a signal indicative of an engine performance parameter. In one example, the engine performance parameter may be associated with the two modes of engine operation described above. For example, sensor 60 may be disposed proximal to crankshaft 22, and configured to measure and generate a signal indicative of an instantaneous angular position of crankshaft 22. Based on this position, a speed of engine 10 may be derived and used to determine when the operation of engine 10 has transitioned from the first mode to the second mode (i.e., when the speed of engine 10 exceeds a starting speed). The position information may also be used to determine a timing at which igniter 54 is energized and/or when injector 56 is controlled to pass pressurized exhaust into combustion chamber 20. In another example, sensor 60 may be a temperature sensor configured to measure and generate a signal indicative of a temperature of engine 10 used to determine when the operation of engine 10 has transitioned from the first mode to the second mode (i.e., when a temperature of engine 10 exceeds a threshold temperature signifying that operation engine 10 can efficiently support auto-ignition). It should be noted that other similar sensors are also contemplated.

Figure 2:
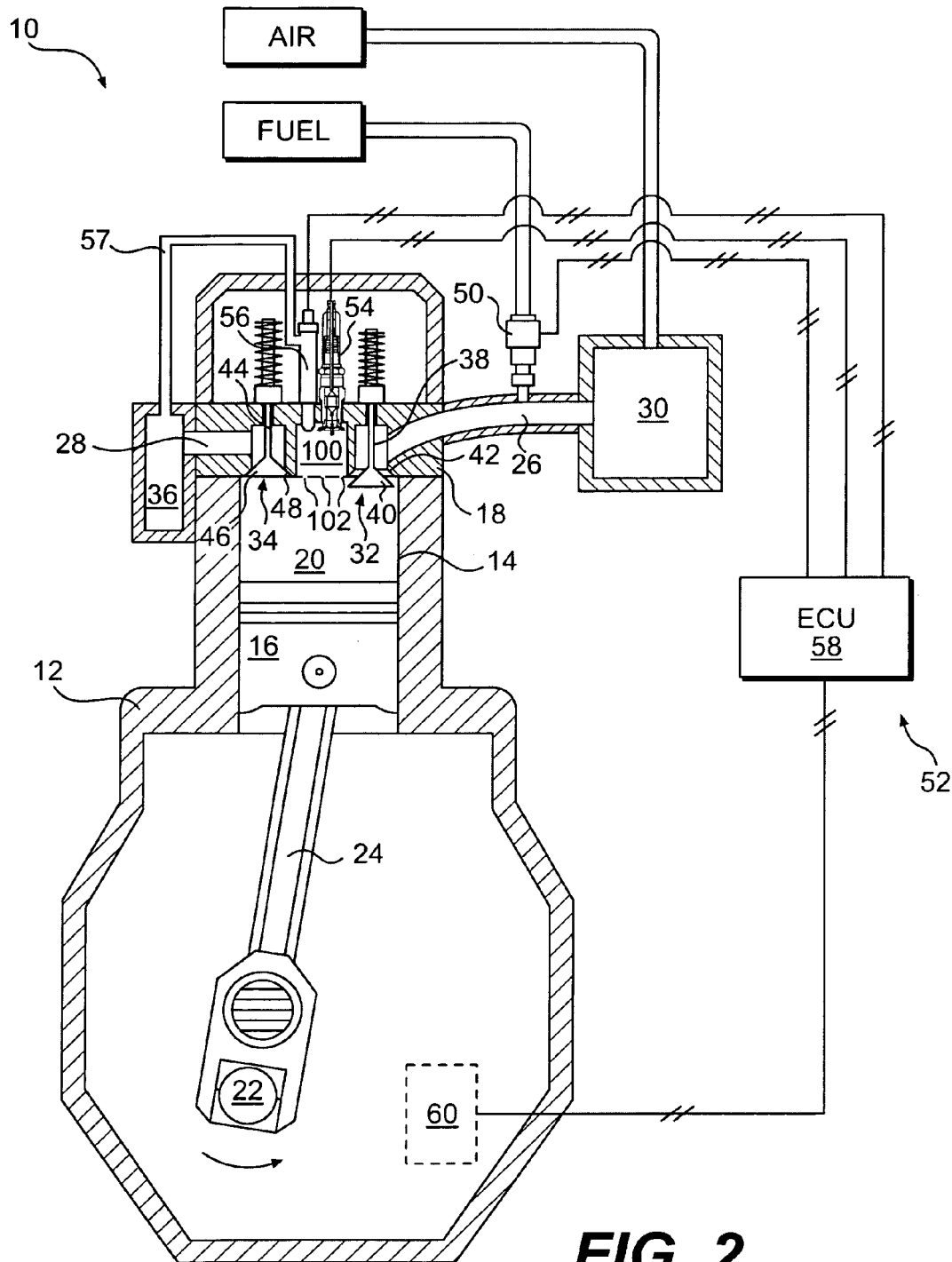
FIG. 2 is another diagrammatic and schematic illustration of another exemplary disclosed engine.

FIG. 2 illustrates an alternate embodiment of engine 10. In contrast to FIG. 1, engine 10 of FIG. 2 includes a pre-combustion chamber 100 having orifices 102. Pre-combustion chamber 100 may be in fluid communication with combustion chamber 20 via orifices 102 and exposed to a mixture of fuel and air similar to that present in combustion chamber 20. It is contemplated that any number of orifices 102 may be included within pre-combustion chamber 100. In this embodiment, igniter 54 and/or injector 56 may be disposed to initiate combustion within pre-combustion chamber 100 instead of directly within combustion chamber 20. After ignition within pre-combustion chamber 100, one or more flame jets may pass from pre-combustion chamber 100 through orifices 102 into combustion chamber 20, thereby igniting the remaining fuel and air mixture. In some embodiments, the use of a pre-combustion chamber may improve the combustion process within the main combustion chamber.

INDUSTRIAL APPLICABILITY

The disclosed ignition system may be applicable to any combustion engine where precise control over combustion initiation is desired. Although particularly suited for use with lean-burn, low-$NO_X$ producing engines, the disclosed ignition system may be used with any combustion engine during any type of operation. The disclosed ignition system may improve combustion initiation of a lean-burn engine by facilitating auto-ignition with injections of heated and pressurized non-combustible gas. And, during startup, cold conditions, or other operations that may not readily support auto-ignition, the disclosed system may utilize a conventional igniter alone or in conjunction with the gas injections. The operation of engine 10 will now be explained.

During an intake stroke of engine 10, as piston 16 is moving within combustion chamber 20 between the TDC position and the BDC position, intake valve 38 may be in the first position, as shown in FIG. 1. During the intake stroke, the downward movement of piston 16 towards the BDC position may create a low-pressure condition within combustion chamber 20. The low-pressure condition may act to draw fuel and air from intake passageway 26 into combustion chamber 20 via intake opening 32. As described above, a turbocharger may alternatively be used to force compressed air and fuel into combustion chamber 20. The fuel may be introduced into the air stream either upstream or downstream of the turbo charger or, alternatively, may be injected directly into combustion chamber 20. It is contemplated that the fuel may alternatively be introduced into combustion chamber 20 during a portion of the compression stroke, if desired.

Following the intake stroke, both intake valve 38 and exhaust valve 44 may be in the second position at which the fuel and air mixture is blocked from exiting combustion chamber 20 during the ensuing upward compression stroke of piston 16. As piston 16 moves upward, from the BDC position towards the TDC position during the compression stroke, the fuel and air within combustion chamber 20 may be mixed and compressed. At a time during the compression stroke or, alternatively, just after completion of the compression stroke, combustion of the compressed mixture may be initiated.

As described above, combustion may be initiated in one of two different ways, depending on the current operation of engine 10. For example, during the first mode of operation (i.e., during engine startup or cold operation), ECU 58 may energize igniter 54 to locally heat the now compressed fuel and air mixture. This local heating may result in a flame that propagates throughout combustion chamber 20, thereby igniting the remaining fuel and air mixture.

During the second mode of operation, injector 56 may introduce the pressurized exhaust gas into combustion chamber 20, thereby increasing the pressure and/or temperature of the air and fuel mixture above its auto-ignition threshold. Injection may occur such that auto-ignition is established just after TDC when piston 16 is moving downward through the power stroke. It is contemplated that auto-ignition may alternatively occur just prior to TDC when piston 16 is completing the compression stroke. It is also contemplated that an additional injection of the exhaust gas may be directed into combustion chamber 20 during either the intake stroke or the exhaust stroke to increase swirling, thereby improving mixing of the fuel and air. It is further contemplated that injector 56 may be used together with igniter 54 during the first mode of operation to enhance ignition, if desired.

In the alternate embodiment of FIG. 2, at the time during the compression stroke or just after completion of the compression stroke, igniter 54 and/or injector 56 may be controlled to initiate combustion first within pre-combustion chamber 100 rather than directly within combustion chamber 20. Because pre-combustion chamber 100 may be fluidly communicated via orifices 102 with a fuel and air mixture similar to that within combustion chamber 20, ignition of the mixture within pre-combustion chamber 100 may result in ignition within combustion chamber 20. That is, as the mixture within pre-combustion chamber 100 ignites, the combustion process occurring within pre-combustion chamber 100 may extend into combustion chamber 20 via orifices 102 to raise the temperature and pressure of the mixture within combustion chamber 20 above the ignition threshold of the mixture within combustion chamber 20. In this manner, injection within pre-combustion chamber 100 may cause ignition of the fuel and air mixture within combustion chamber 20. Because the volume of pre-combustion chamber 100 may be smaller than the volume of combustion chamber 20, the injection amount of exhaust gas into pre-combustion chamber 100 required to cause auto-ignition of the fuel and air mixture may be less than when injection occurs directly into combustion chamber 20.

Because engine 10 may utilize two different sources of ignition for different operating conditions, reliability and performance of engine 10 may be enhanced. In particular, the use of igniter 54 may enhance starting and operation of engine 10 under cold conditions, while the use of injector 56 may improve efficiency and lower emissions during normal operation.

It will be apparent to those skilled in the art that various modifications and variations can be made to the disclosed ignition system. Other embodiments will be apparent to those skilled in the art from consideration of the specification and practice of the disclosed ignition system. It is intended that the specification and examples be considered as exemplary only, with a true scope being indicated by the following claims and their equivalents.

What is claimed is:

1. An ignition system for an engine, comprising:
   an igniter connected to selectively ignite a fuel mixture within the engine;
   an injector located to inject a non-combustible gas directly into a combustion chamber of the engine; and
   a controller in communication with the igniter and the injector, the controller being configured to:
      energize the igniter during a first mode of engine operation to ignite the fuel mixture;
      cease energizing the igniter during a second mode of engine operation following the first mode of engine operation; and
      actuate the injector during the second mode of engine operation to raise a temperature and a pressure within the combustion chamber to initiate auto-ignition of the fuel mixture without the use of the igniter.

2. The ignition system of claim 1, wherein the first mode of operation is associated with startup of the engine.

3. The ignition system of claim 1, wherein the first mode of operation is associated with operation of the engine under cold conditions.

4. The ignition system of claim 1, where the igniter is one of a spark plug or a glow plug.

5. The ignition system of claim 1, wherein the non-combustible gas is heated prior to injection.

6. The ignition system of claim 5, wherein the non-combustible gas is exhaust heated by the combustion process.

7. The ignition system of claim 1, wherein the non-combustible gas is pressurized.

8. The ignition system of claim 7, wherein the injector pressurizes the non-combustible gas.

9. The ignition system of claim 1, wherein the controller is further configured to actuate the injector during the first mode of engine operation at about the same time the igniter is energized.

10. A method of initiating combustion within an engine, comprising:
    locally heating a fuel mixture within the engine to initiate combustion during a first mode of engine operation;
    ceasing the local heating during a second mode of engine operation; and
    injecting a non-combustible gas directly into a combustion chamber of the engine during the second mode of engine operation to initiate auto-ignition of the fuel mixture.

11. The method of claim 10, wherein the first mode of engine operation is associated with at least one of startup of the engine and operation of the engine under cold conditions.

12. The method of claim 10, further including heating the non-combustible gas prior to injecting.

13. The method of claim 12, wherein the non-combustible gas is exhaust heated during the combustion process.

14. The method of claim 10, further including pressurizing the non-combustible gas.

15. The method of claim 10, further including injecting the non-combustible gas during the first mode of engine operation at about the same time the fuel mixture is locally heated.

16. An engine, comprising:
    an engine block at least partially defining a cylinder;
    a piston recipratingly disposed within the cylinder to form a combustion chamber;
    a first injector configured to inject fuel into the combustion chamber;
    a supply of air in selective communication with the combustion chamber;
    an igniter located to locally heat a mixture of the fuel and air; and
    a second injector configured to inject a non-combustible gas directly into the combustion chamber.

17. The engine of claim 16, further including a controller in communication with the igniter and the injector, the controller being configured to:
    energize the igniter during a first mode of engine operation to ignite the mixture;
    cease energizing the igniter during a second mode of engine Operation; and
    actuate the second injector during the second mode of engine operation to raise a temperature and a pressure within the combustion chamber and initiate auto-ignition of the mixture, wherein the first mode of operation is associated with at least one of startup of the engine and operation of the engine under cold conditions.

18. The engine of claim 16, wherein the igniter is one of a spark plug or a glow plug.

19. The engine of claim 16, wherein the non-combustible gas is exhaust heated by the combustion process prior to injection and pressurized by the injector during injection.

20. The engine of claim 16, wherein the combustion chamber is a pre-combustion chamber and the engine further includes a main combustion chamber in communication with the pre-combustion chamber and the first injector.

\* \* \* \* \*